(12) United States Patent
Igarashi

(10) Patent No.: US 10,766,485 B2
(45) Date of Patent: Sep. 8, 2020

(54) VEHICLE CONTROL DEVICE

(71) Applicant: TOYOTA JIDOSHA KABUSHIKI KAISHA, Toyota-shi, Aichi-ken (JP)

(72) Inventor: Ryo Igarashi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 60 days.

(21) Appl. No.: 16/126,109

(22) Filed: Sep. 10, 2018

(65) Prior Publication Data

US 2019/0106102 A1    Apr. 11, 2019

(30) Foreign Application Priority Data

Oct. 11, 2017 (JP) ................................ 2017-197609

(51) Int. Cl.
*B60W 30/09* (2012.01)
*G06K 9/00* (2006.01)
(Continued)

(52) U.S. Cl.
CPC ........... *B60W 30/09* (2013.01); *G05D 1/0088* (2013.01); *G05D 1/0212* (2013.01);
(Continued)

(58) Field of Classification Search
CPC ........ B60W 30/09; B60W 2050/0091; B60W 2050/065; B60W 2420/42;
(Continued)

(56) References Cited

U.S. PATENT DOCUMENTS

2010/0228419 A1* 9/2010 Lee ...................... G05D 1/0246
701/25
2013/0151135 A1* 6/2013 Aubrey ................ G08G 1/0116
701/118

(Continued)

FOREIGN PATENT DOCUMENTS

JP    2016-162299 A    9/2016
JP    2017-194527 A    10/2017
(Continued)

OTHER PUBLICATIONS

Koji Taguchi et al., "Future Advanced Driving Support System with Automated Driving Technology ITS & Advanced Driving Support Systems," Japan SPOTLIGHT, Jul./Aug. 2016, pp. 28-33.

*Primary Examiner* — Atul Trivedi
(74) *Attorney, Agent, or Firm* — Sughrue Mion, PLLC

(57) ABSTRACT

A vehicle control device includes a detection unit detecting an object around the vehicle, a storage unit storing static object information acquired in advance and reliability of the static object information in association with each other, an acquisition unit acquiring calculation load information of the vehicle control device, a decision unit deciding a reliability threshold to be small with respect to an increase in a calculation load based on the calculation load information, a selection unit selecting the static object information associated with reliability equal to or greater than the reliability threshold from the static object information, a target decision unit deciding a tracking target by comparing a detection result and the static object information selected by the selection unit to each other, a tracking unit tracking the tracking target, and a control unit performing the traveling control based on a tracking result.

6 Claims, 11 Drawing Sheets

(51) Int. Cl.
*G06T 7/20* (2017.01)
*G06D 1/02* (2006.01)
*G05D 1/00* (2006.01)
*G06T 7/593* (2017.01)
*G05D 1/02* (2020.01)

(52) U.S. Cl.
CPC .......... G06K 9/00791 (2013.01); G06T 7/20 (2013.01); *B60W 2420/42* (2013.01); *B60W 2420/52* (2013.01); *B60W 2554/80* (2020.02); *G05D 2201/0213* (2013.01); *G06T 7/593* (2017.01); *G06T 2207/10012* (2013.01); *G06T 2207/10028* (2013.01); *G06T 2207/10044* (2013.01); *G06T 2207/30252* (2013.01)

(58) Field of Classification Search
CPC ......... B60W 2420/52; B60W 2550/30; B60W 30/10; B60W 40/04; G05D 1/0088; G05D 1/0212; G05D 2201/0213; G06K 9/00791; G06T 7/20; G06T 7/593; G06T 2207/10012; G06T 2207/10044; G06T 2207/30252
USPC .......................................................... 701/24
See application file for complete search history.

(56) References Cited

U.S. PATENT DOCUMENTS

| | | | |
|---|---|---|---|
| 2015/0086074 A1* | 3/2015 | Kasahara | G06F 21/32 382/103 |
| 2015/0172582 A1* | 6/2015 | Kiyohara | B60S 1/56 348/322 |
| 2015/0370587 A1* | 12/2015 | Kureha | G06F 9/45558 718/1 |
| 2016/0158625 A1* | 6/2016 | DeAngelis | H04W 4/80 340/539.13 |
| 2016/0259335 A1 | 9/2016 | Oyama | |
| 2016/0284417 A1* | 9/2016 | Atsumi | G11C 29/021 |
| 2017/0124781 A1* | 5/2017 | Douillard | G08G 1/202 |
| 2017/0248949 A1* | 8/2017 | Moran | G08G 1/165 |
| 2017/0299397 A1 | 10/2017 | Ichikawa et al. | |
| 2017/0308093 A1 | 10/2017 | Urano et al. | |
| 2017/0363741 A1* | 12/2017 | Send | H04N 5/2354 |
| 2019/0310650 A1* | 10/2019 | Halder | G06N 3/006 |
| 2019/0310654 A1* | 10/2019 | Halder | G05D 1/0088 |
| 2019/0325230 A1* | 10/2019 | Nadler | G06K 9/00744 |

FOREIGN PATENT DOCUMENTS

| | | |
|---|---|---|
| JP | 2017-194827 A | 10/2017 |
| JP | 2017-194830 A | 10/2017 |
| JP | 2017-194831 A | 10/2017 |
| JP | 2017-207821 A | 11/2017 |
| JP | 2017-208040 A | 11/2017 |

* cited by examiner

VEHICLE CONTROL DEVICE

CROSS-REFERENCE TO RELATED APPLICATION

This application is based on Japanese Patent Application No. 2017-197609 filed with Japan Patent Office on Oct. 11, 2017, the entire contents of which are hereby incorporated by reference.

TECHNICAL FIELD

The present disclosure relates to a vehicle control device.

BACKGROUND

Japan SPOTLIGHT 2016 July/August pp. 28-pp. 33 "Future Advanced Driving Support System with Automated Driving Technology" discloses a background subtraction method for detecting a dynamic object. According to this method, the measurement result of a sensor at a time when no dynamic object is present is stored in a database as static object information. Then, the static object information is compared to the measurement result of the sensor at each time. The difference between both (part where both do not correspond) is detected as the dynamic object.

SUMMARY

The positions and shapes of objects around a vehicle need to be tracked and grasped for appropriate driving of the vehicle. However, tracking every object around the vehicle is unrealistic. This is because the calculation resources of a device are limited and calculation needs to be completed within a required calculation time. Conceivable in this regard is dynamic object identification by the background subtraction method and tracking limitation to dynamic objects assuming that the static object information changes less than dynamic object information.

However, it is difficult to maintain the static object information with high accuracy at all times. This is because some static object information significantly changes with time. For instance, the positions and the shapes of grass, trees, construction targets, trash on roads, and so on change on an hourly basis. In the case of inaccurate static object information, the number of tracking targets cannot be appropriately reduced even by the background subtraction method, and thus the calculation load is not reduced. Accordingly, when the background subtraction method is used, static object information suitable as an object of comparison, that is, high-reliability static object information needs to be selected. When the required reliability is set high, in the meantime, selectable static object information may be reduced. In this case, the effect of tracking target limitation based on the background subtraction method is reduced, and thus the calculation load may not be sufficiently reduced. Desirable in this technical field is a vehicle control device that is capable of selecting an object tracking target in view of balance between a calculation load and the reliability of static object information.

An aspect of the present disclosure relates to a vehicle control device performing traveling control of a vehicle. The vehicle control device includes a detection unit configured to detect an object around the vehicle, a storage unit configured to store static object information acquired in advance and reliability of the static object information in association with each other, an acquisition unit configured to acquire calculation load information of the vehicle control device, a decision unit configured to decide a reliability threshold to be small with respect to an increase in a calculation load based on the calculation load information acquired by the acquisition unit, a selection unit configured to select the static object information associated with reliability equal to or greater than the reliability threshold decided by the decision unit from the static object information stored in the storage unit, a target decision unit configured to decide a tracking target by comparing a detection result of the detection unit and the static object information selected by the selection unit to each other, a tracking unit configured to track the tracking target decided by the target decision unit, and a control unit configured to perform the traveling control based on a tracking result of the tracking unit.

In this vehicle control device, the selection unit selects the static object information associated with reliability equal to or greater than the reliability threshold. Then, the reliability threshold is decided to be small with respect to an increase in the calculation load by the decision unit. In other words, this vehicle control device is capable of increasing the number of selected static object information by lowering the reference of the reliability of the static object information selected as an object of comparison when the calculation load is large. As a result, the vehicle control device is capable of reducing the targets of the object tracking with respect to an increase in the calculation load in a state where reliability equal to or greater than the reliability threshold is secured. In addition, this vehicle control device is capable of decreasing the number of selected static object information by raising the reference of the reliability of the static object information selected as an object of comparison when the calculation load is small. As a result, the vehicle control device is capable of increasing the targets of the object tracking with respect to a decrease in the calculation load in a state where reliability equal to or greater than the reliability threshold is secured. In this manner, the vehicle control device is capable of selecting the target of the object tracking in view of balance between the calculation load and the reliability of the static object information.

In an example, the vehicle control device may further include a determination unit configured to determine whether or not the object detected by the detection unit is the static object based on the static object information stored in the storage unit, a calculation unit configured to calculate reliability of a detection result of the object determined as the static object by the determination unit, a target selection unit configured to select the detection result of the object in a predetermined priority order such that a total capacity of selected detection results of the objects is equal to or less than a predetermined communication amount, and a communication unit configured to transmit the detection result of the object selected by the target selection unit to a server capable of communicating with the vehicle. The target selection unit may give a higher priority order to a detection result of the object with the lower reliability calculated by the calculation unit. In this case, the vehicle control device is capable of preferentially transmitting a low-reliability object detection result to the server in a limited communication capacity.

In an example, the decision unit may decide the reliability threshold for each of the static object information and decide the reliability threshold to be small with respect to an increase in a distance between the vehicle and the static object. In this case, the vehicle control device is capable of preferentially selecting a distant static object unlikely to come into contact with the vehicle as static object information to be compared.

According to the form of the present disclosure, an object tracking target can be selected in view of balance between the calculation load and the reliability of the static object information.

DETAILED DESCRIPTION

Figure 1:
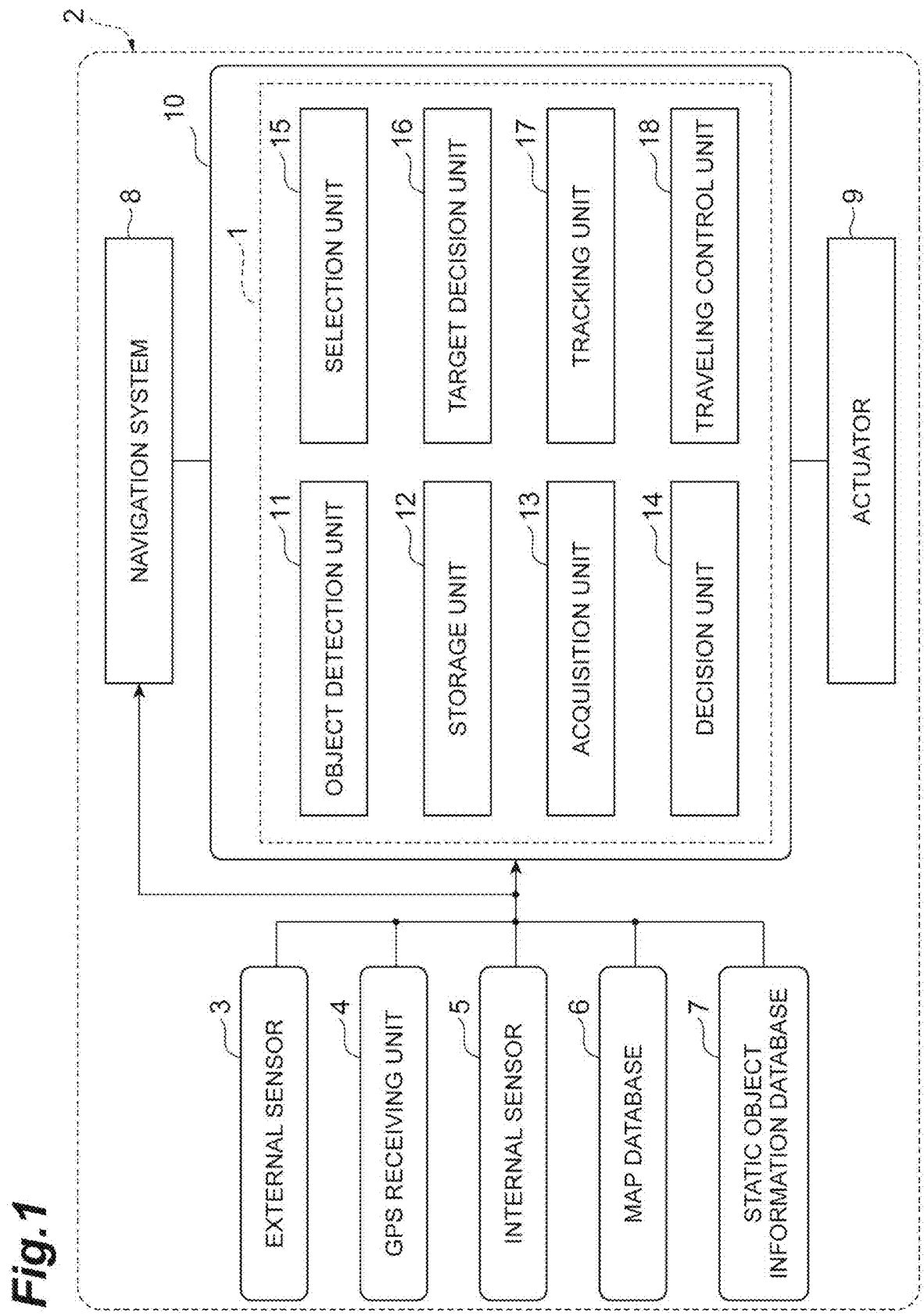
FIG. 1 is a block diagram illustrating an instance of the configuration of a vehicle provided with a vehicle control device according to a first example.

Hereinafter, this example will be described with reference to accompanying drawings. In the following description, the same reference numerals will be used to refer to the same or equivalent elements so that duplicate description is not repeated.

First Example

Configuration of Vehicle Control Device

FIG. 1 is a block diagram illustrating an instance of the configuration of a vehicle 2 provided with a vehicle control device 1 according to a first example. As illustrated in FIG. 1, the vehicle control device 1 is mounted in the vehicle 2 such as a passenger car.

The vehicle control device 1 performs control of the vehicle 2. The vehicle control is processing in general relating to traveling and driving of the vehicle 2. As an instance, the vehicle control includes driving support or autonomous driving. The autonomous driving is control for autonomous traveling of the vehicle 2 toward a preset destination.

The vehicle 2 has an external sensor 3, a GPS receiving unit 4, an internal sensor 5, a map database 6, a static object information database 7, a navigation system 8, an actuator 9, and an electronic control unit (ECU) 10.

The external sensor 3 is detection equipment detecting a situation around the vehicle 2. The external sensor 3 includes at least one of a camera and a radar sensor. The camera is imaging equipment imaging the external situation around the vehicle 2. The camera is disposed on the back side of the windshield of the vehicle 2. The camera transmits imaging information related to the external situation regarding the vehicle 2 to the ECU 10. The camera may be a monocular camera or may be a stereo camera. The stereo camera has two imaging units that are placed to reproduce a binocular disparity. Depth direction information is also included in the imaging information of the stereo camera. The radar sensor is detection equipment detecting objects around the vehicle 2 by using radio waves (such as millimeter waves) or light. The radar sensor includes, for instance, a millimeter wave radar device or a light detection and ranging (LIDAR) device. The radar sensor detects the objects by transmitting the radio waves or the light to the surroundings of the vehicle 2 and receiving the radio waves or the light reflected by the objects. The radar sensor transmits detected object information to the ECU 10. The objects include moving objects such as pedestrians, bicycles, and other vehicles as well as fixed objects such as guardrails and buildings.

The GPS receiving unit 4 is mounted in the vehicle 2 and functions as a position measurement unit measuring the position of the vehicle 2. The GPS receiving unit 4 measures the position of the vehicle 2 (such as the latitude and the longitude of the vehicle 2) by receiving signals from at least three GPS satellites. The GPS receiving unit 4 transmits measured positional information regarding the vehicle 2 to the ECU 10 and 20.

The internal sensor 5 is detection equipment detecting the traveling state of the vehicle 2. The internal sensor 5 includes at least one of a vehicle speed sensor, an acceleration sensor, and a yaw rate sensor. The vehicle speed sensor is a detector that detects the speed of the vehicle 2. A vehicle wheel speed sensor that is disposed with respect to a vehicle wheel of the vehicle 2, a drive shaft rotating integrally with the vehicle wheel, or the like and detects the rotation speed of the vehicle wheel is used as the vehicle speed sensor. The vehicle speed sensor transmits detected vehicle speed information to the ECU 10. The acceleration sensor is a detector that detects the acceleration of the vehicle 2. The acceleration sensor includes a longitudinal acceleration sensor detecting the acceleration of the vehicle 2 in a longitudinal direction and a lateral acceleration sensor detecting the lateral acceleration of the vehicle 2. The acceleration sensor transmits acceleration information regarding the vehicle 2 to the ECU 10. The yaw rate sensor is a detector that detects the yaw rate (rotation angular velocity) around the vertical axis of the center of gravity of the vehicle 2. A gyro sensor or the like can be used as the yaw rate sensor. The yaw rate sensor transmits detected yaw rate information regarding the vehicle 2 to the ECU 10.

The map database 6 is a database in which map information is stored. The map database 6 is formed within a mass storage device such as a hard disk drive (HDD) that is mounted in the vehicle 2. The map information includes, for instance, positional information regarding roads, road shape information, positional information regarding junctions and intersection points, and road speed limits. The road shape information includes, for instance, the types of curves and linear sections, the curvatures of curves, and the slopes of road surfaces (uphill and downhill). The map database 6 may be stored in a server capable of communicating with the vehicle 2.

The static object information database 7 is a database storing static object information acquired in advance. The static object information database 7 is formed within a mass storage device such as a hard disk drive (HDD) that is mounted in the vehicle 2. The static object information is information relating to a static object. The static object is an object that has no power or moving mechanism. Static objects are, for instance, buildings, plants, road signs, traffic signals, electric poles, trash cans on roads, and construction equipment. The static object information includes at least the position coordinates of the static objects. In other words, static object identifiers and positions are stored in association with each other in the static object information database 7. The static object information may also include, for instance, sizes, shapes, types, seasons, the weather, humidity, temperature, and dates of acquisition regarding the static objects.

Information reliability is associated with the static object information. The information reliability is a degree indicating the certainty of information. In other words, in the static object information database 7, the static object information acquired in advance and the reliability of the static object information are stored in association with each other. As an instance, in the static object information database 7, the static object information and the reliability are associated with each other by the static object identifiers and stored. The static object information database 7 may be stored in a server capable of communicating with the vehicle 2.

The reliability of the static object information is calculated in view of, for instance, the detection state of the external sensor 3. As an instance, the reliability is calculated lower when the detection accuracy of the external sensor 3 is low than when the detection accuracy of the external sensor 3 is high. Alternatively, the reliability may be calculated lower when the detection frequency of the external sensor 3 per unit time is low than when the detection frequency of the external sensor 3 per unit time is high. Alternatively, the reliability may be calculated lower when the accuracy of estimation of the position of the vehicle 2 by the external sensor 3 is low than when the accuracy of estimation of the position of the vehicle 2 by the external sensor 3 is high.

The reliability of the static object information may be corrected by means of information included in the static object information such as shapes, types, places, seasons, the weather, humidity, and temperature. For instance, the calculated reliability is corrected low when the shape of the static object is a shape unlikely to be detected by the external sensor 3. For instance, the calculated reliability is corrected low when the weather at a time when the static object is detected is a rainy weather. The reliability may also be calculated as a weighted linear sum of the information included in the static object information.

The navigation system 8 is mounted in the vehicle 2 and sets a target traveling route of the vehicle 2. The navigation system 8 calculates the target route leading from the position of the vehicle 2 to the destination based on the preset destination, the position of the vehicle 2 measured by the GPS receiving unit 4, and the map information of the map database 6. The preset destination is set by an occupant of the vehicle 2 operating an input button (or a touch panel) of the navigation system 8. The target route is set with lanes constituting a road distinguished. The navigation system 8 is capable of setting the target route by a known method. The navigation system 8 performs target route notification with respect to a driver by means of display on a display and speaker-based voice output. The navigation system 8 may output information regarding the target route of the vehicle 2 to the ECU 10.

The actuator 9 is a device that controls the traveling of the vehicle 2. The actuator 9 includes at least a throttle actuator, a brake actuator, and a steering actuator. The throttle actuator controls the drive force of the vehicle 2 by controlling the amount of air supply to an engine (throttle opening degree) in accordance with a control signal from the ECU 10. When the vehicle 2 is a hybrid vehicle, the drive force is controlled by a control signal from the ECU 10 being input to a motor as a power source as well as by means of the amount of air supply to an engine. When the vehicle 2 is an electric vehicle, the drive force is controlled by a control signal from the ECU 10 being input to a motor as a power source. The motors as a power source in these cases constitute the actuator 9. The brake actuator controls a brake system in accordance with a control signal from the ECU 10 and controls a braking force given to the vehicle wheel of the vehicle 2. A hydraulic brake system can be used as the brake system. The steering actuator controls, in accordance with a control signal from the ECU 10, driving of an assist motor that controls a steering torque in an electric power steering system. In this manner, the steering actuator controls the steering torque of the vehicle 2.

The ECU 10 is a computing device that oversees the vehicle control. As an instance, the ECU 10 performs tracking of an object around the vehicle 2 and traveling control based on the tracking. The ECU 10 is an electronic control unit that has a central processing unit (CPU), a read only memory (ROM), a random access memory (RAM), a controller area network (CAN) communication circuit, and the like. The ECU 10 realizes each of the following functions by loading a program stored in the ROM into the RAM and executing the program loaded into the RAM with the CPU. Any number of electronic control units may constitute the ECU 10 as well. The external sensor 3, the GPS receiving unit 4, the internal sensor 5, the map database 6, the static object information database 7, the navigation system 8, and the actuator 9 described above are connected to the ECU 10.

Functionally, the ECU 10 has an object detection unit 11 (an instance of a detection unit), a storage unit 12, an acquisition unit 13, a decision unit 14, a selection unit 15, a target decision unit 16, a tracking unit 17, and a traveling control unit 18 (an instance of a control unit). Some of the functions of the ECU 10 may be executed on a server capable of communicating with the vehicle 2.

The object detection unit 11 detects an object around the vehicle 2 based on the detection result of the external sensor 3. For instance, the object detection unit 11 detects an object around the vehicle 2, including the position of the object around the vehicle 2, by a known method and based on an image captured by the camera and/or the object information of the radar sensor.

The storage unit 12 stores the static object information acquired in advance and the reliability of the static object information in association with each other. For instance, the storage unit 12 acquires the reliability and the static object information associated with the static object identifier from the static object information database 7 and holds the reliability and the static object information. The storage unit 12 may also hold the reliability and the static object information relating to a static object present around the position of the vehicle 2 received by the GPS receiving unit 4 among the reliability and the static object information stored in the static object information database 7.

The acquisition unit 13 acquires calculation load information regarding the vehicle control device 1. The calculation load information is information indicating a calculation load and is information indicating a processing amount. The calculation load information is, for instance, a utilization rate or an occupancy rate regarding hardware resources or software resources. The calculation load increases as the utilization rate or the occupancy rate increases. As an instance, the acquisition unit 13 acquires the processor time of the CPU of the ECU 10, the memory usage of the ECU 10, or the like as the calculation load information. The acquisition unit 13 may also calculate, as the calculation load information, the weighted linear sum that is obtained by addition of the information such as the processor time and the memory usage multiplied by a coefficient. The acquisition unit 13 may also acquire, as the calculation load information, information allowing estimation of the calculation load such as a CPU temperature. The acquisition unit 13 may also predict the calculation load information after the elapse of a predetermined time based on the transition of the calculation load information.

The decision unit 14 decides a reliability threshold. The reliability threshold is a threshold for determining the reliability of the static object information. The reliability threshold is a threshold for determining whether or not the static object information is an object of comparison to the detection result of the external sensor 3. The reliability threshold is the lower limit value of the reliability of the static object information that is an object of comparison to the detection result of the external sensor 3. In other words, the static object information associated with reliability equal to or greater than the reliability threshold is an object of comparison to the detection result of the external sensor 3.

The decision unit 14 decides the reliability threshold to be small with respect to an increase in the calculation load based on the calculation load information acquired by the acquisition unit 13. The reliability threshold decided to be small with respect to an increase in the calculation load includes, for instance, a case where the reliability threshold monotonically decreases in accordance with an increase in the calculation load, a case where the reliability threshold exponentially decreases in accordance with an increase in the calculation load, and a case where the reliability threshold decreases in stages in accordance with an increase in the calculation load. In other words, as an overall tendency, the reliability threshold may decrease as the calculation load increases.

Figure 2:
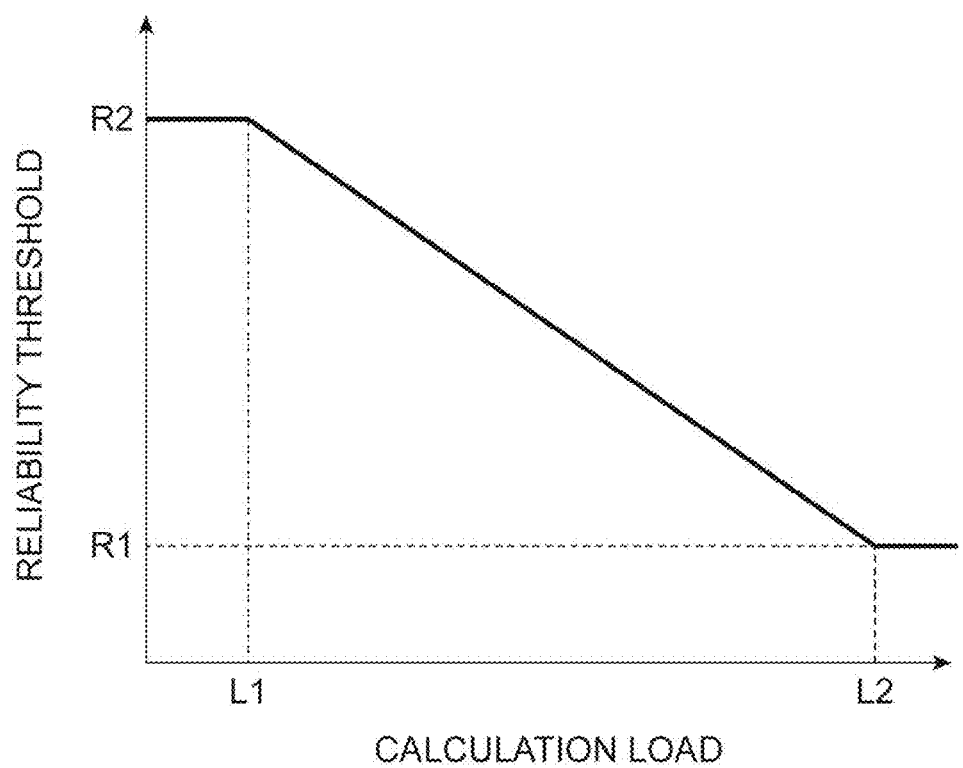
FIG. 2 is an instance of a graph illustrating the relationship between a reliability threshold and a calculation load.

FIG. 2 is an instance of a graph illustrating the relationship between the reliability threshold and the calculation load. In FIG. 2, the vertical axis represents the reliability threshold and the horizontal axis represents the calculation load. As an instance, the decision unit 14 decides the reliability threshold with reference to the graph illustrated in FIG. 2 and by using the calculation load information acquired by the acquisition unit 13. The decision unit 14 decides a second value R2 as the reliability threshold when the calculation load is equal to or less than L1. Here, the second value R2 is the maximum value of the reliability threshold. When the calculation load is greater than L1 and is equal to or less than L2, the decision unit 14 sets the reliability threshold to a value between the second value R2 and a first value R1. Here, the first value R1 is the minimum value of the reliability threshold. When the calculation load is greater than L1 and is equal to or less than L2, the reliability threshold monotonically decreases to decrease as the calculation load increases. When the calculation load is equal to or greater than L2, the decision unit 14 decides the first value R1 as the reliability threshold. Although the reliability threshold is constant when the calculation load is equal to or less than L1 and when the calculation load is equal to or greater than L2 in the instance illustrated in FIG. 2, the present disclosure is not limited thereto and the reliability threshold may decrease as an overall tendency as the calculation load increases. In addition, the decision unit 14 may also calculate the reliability threshold by using a formula with which the graph in FIG. 2 can be reproduced instead of referring to the graph illustrated in FIG. 2.

The selection unit 15 selects the static object information associated with the reliability equal to or greater than the reliability threshold decided by the decision unit 14 from the static object information stored in the storage unit 12.

The target decision unit 16 decides a tracking target by comparing the detection result of the object detection unit 11 and the static object information selected by the selection unit 15 to each other. The tracking target is a motion acquisition target. As an instance, the target decision unit 16 calculates the difference between the detection result of the object detection unit 11 developed in a three-dimensional space and the static object information developed in a three-dimensional space and selected by the selection unit 15. The target decision unit 16 recognizes the contour of an object from the calculated difference and as the tracking target.

The tracking unit 17 tracks the tracking target decided by the target decision unit 16. As an instance, the tracking unit 17 acquires the motion of the tracking target based on the detection result of the external sensor 3 acquired in time series.

The traveling control unit 18 performs traveling control based on the tracking result of the tracking unit 17. The traveling control unit 18 performs the traveling control based on the motion of the tracking target tracked by the tracking unit 17. As an instance, the traveling control unit 18 changes the current traveling state by operating the actuator 9 or urges the driver to operate the actuator 9 when the course predicted from the motion of the tracking target intersects with the course of the vehicle 2.

Operation of Vehicle Control Device

Figure 3:
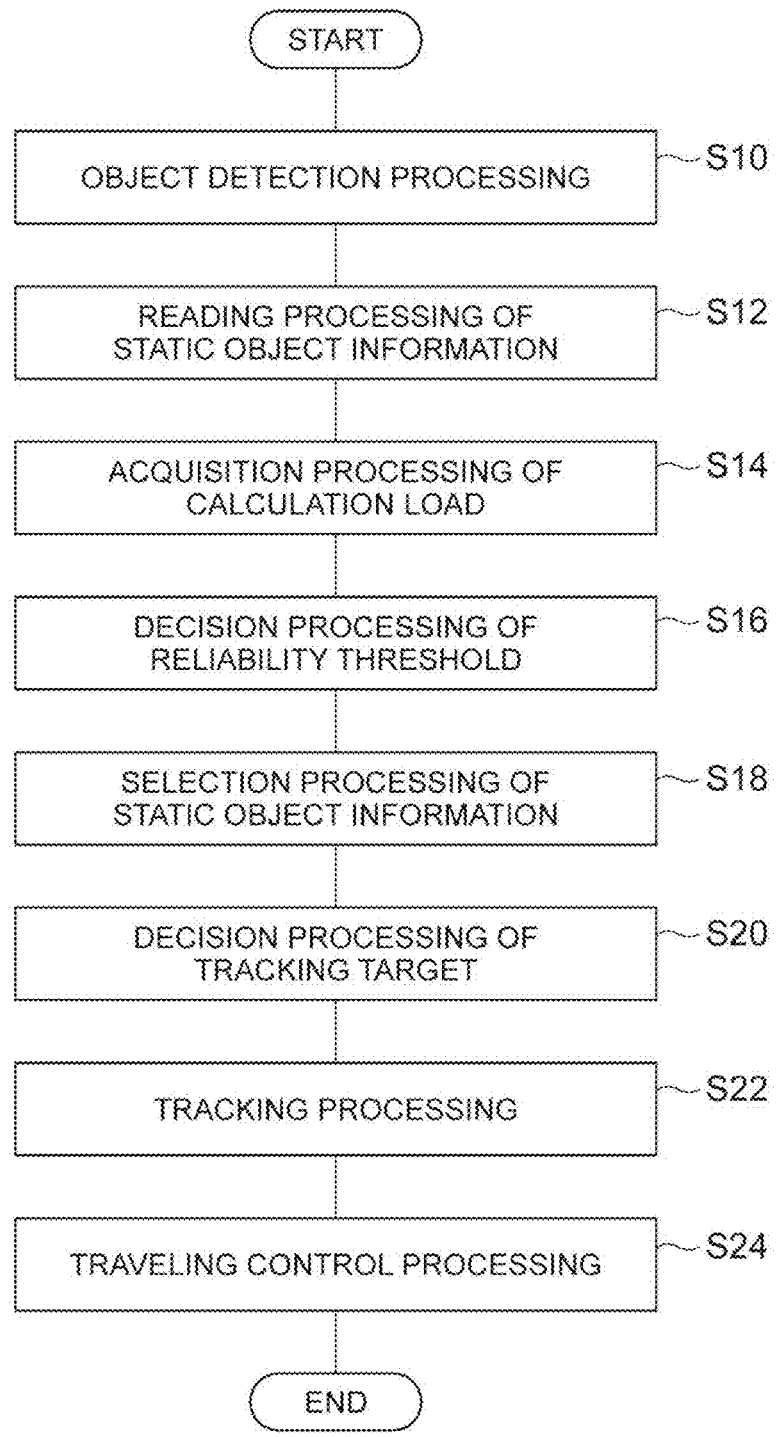
FIG. 3 is a flowchart illustrating an instance of vehicle control processing.

FIG. 3 is a flowchart illustrating an instance of vehicle control processing. The flowchart illustrated in FIG. 3 is executed at a timing when, for instance, a driving operation for traveling control initiation instruction is accepted by the driver.

Figure 4:
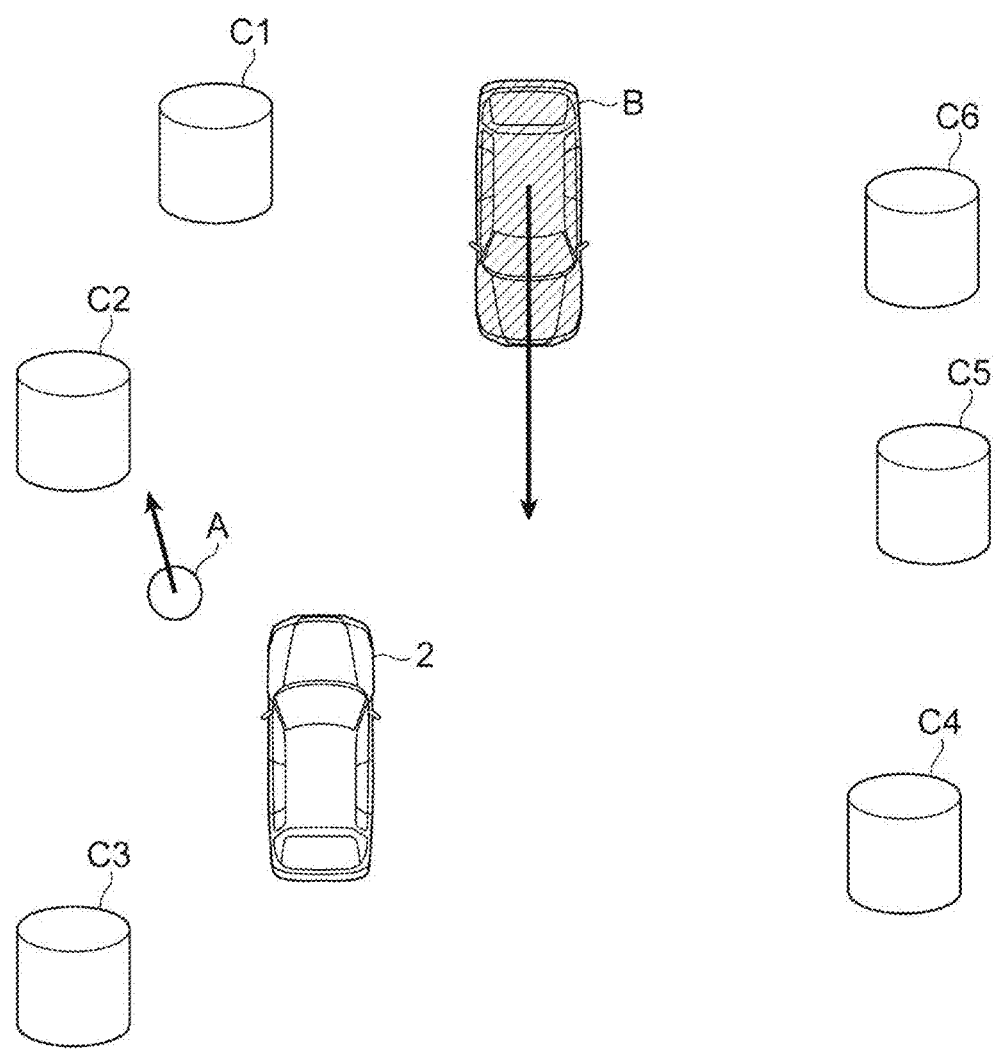
FIG. 4 is a diagram showing an instance of an object detected around the vehicle.

As illustrated in FIG. 3, the object detection unit 11 of the vehicle control device 1 detects objects around the vehicle 2 based on the detection result of the external sensor 3 as object detection processing (S10). FIG. 4 is a diagram showing an instance of the objects detected around the vehicle 2. In FIG. 4, a pedestrian A, another vehicle B, and a first static object C1 to a sixth static object C6 are present around the vehicle 2.

Next, the storage unit 12 of the vehicle control device 1 reads the reliability and the static object information associated with the static object identifier from the static object information database 7 and holds the reliability and the static object information as static object information reading processing (S12).

Figure 5:
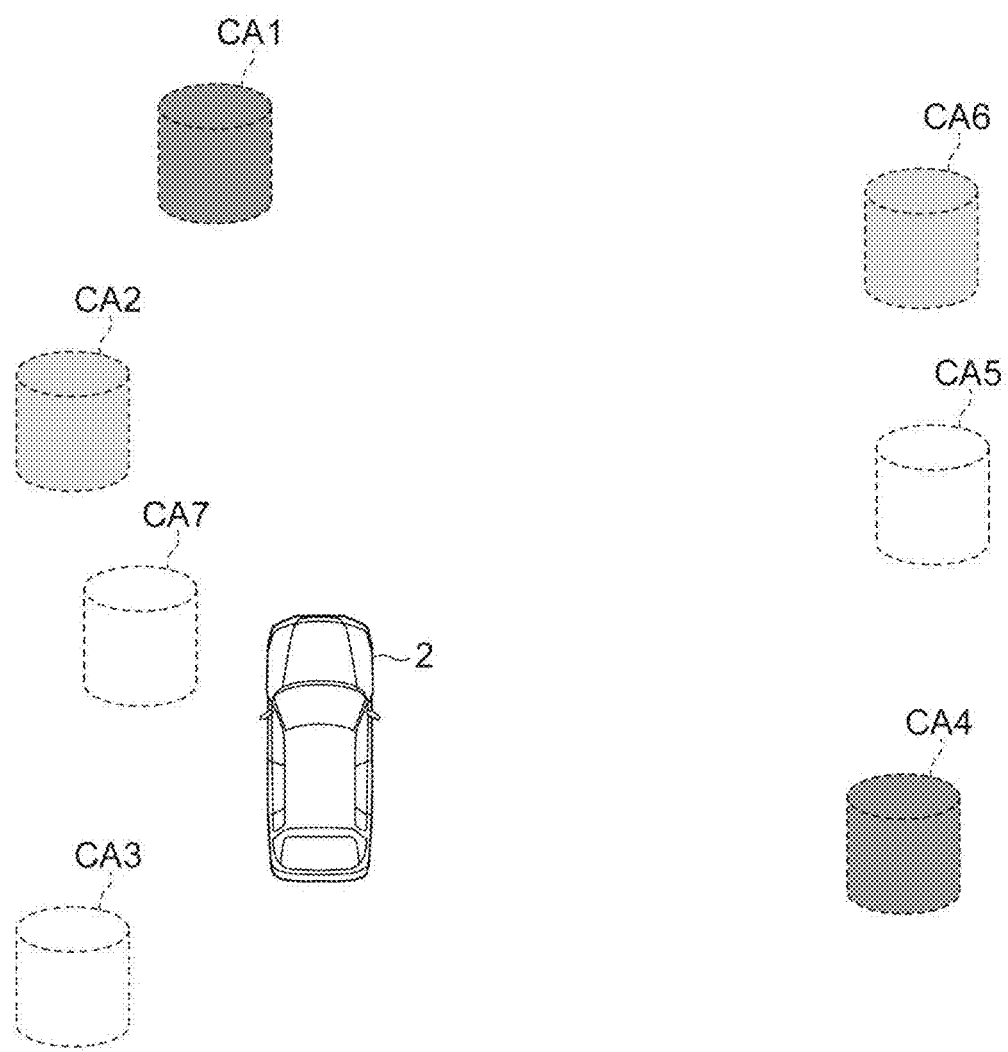
FIG. 5 is a diagram showing an instance of static object information corresponding to FIG. 4.

FIG. 5 is a diagram showing an instance of the static object information corresponding to FIG. 4. Illustrated in FIG. 5 are the reliability and the position regarding the information on the static objects around the vehicle 2 held in the storage unit 12. The colors represent the reliability. A darker color represents higher reliability and a lighter color represents lower reliability. A first static object CA1 and a fourth static object CA4 have the highest reliability and the reliability of the first static object CA1 and the fourth static object CA4 is greater than the second value R2. A second static object CA2 and a sixth static object CA6 have the second-highest reliability and the reliability of the second static object CA2 and the sixth static object CA6 is greater than a first threshold and is less than the second value R2. A third static object CA3, a fifth static object CA5, and a seventh static object CA7 have the lowest reliability and the threshold of the third static object CA3, the fifth static object CA5, and the seventh static object CA7 is less than the first value R1.

In the static object information illustrated in FIG. 5, the first static object CA1 to the sixth static object CA6 correspond to the first static object C1 to the sixth static object C6 illustrated in FIG. 4 and actually present around the vehicle 2. In FIG. 5, the static object information held in the storage unit 12 includes the low-reliability seventh static object CA7, which is not illustrated in FIG. 4 as a static object actually present around the vehicle 2. The position of the seventh static object CA7 overlaps the position of the actually detected pedestrian A.

Next, the acquisition unit 13 of the vehicle control device 1 acquires the memory usage and the processor time of the CPU of the ECU 10 as calculation load acquisition processing (S14). Then, the acquisition unit 13 calculates the calculation load information by weighted linear sum.

Next, the decision unit 14 of the vehicle control device 1 decides the reliability threshold to be small with respect to an increase in the calculation load based on the calculation load information acquired in the acquisition processing (S14) as reliability threshold decision processing (S16). The decision unit 14 refers to, for instance, the graph in FIG. 2. As an instance, the calculation load information acquired in the acquisition processing (S14) is assumed to be the calculation load L2. In this case, the decision unit 14 sets the reliability threshold to the first value R1.

Next, the selection unit 15 of the vehicle control device 1 selects, as static object information selection processing (S18), the static object information associated with reliability equal to or greater than the reliability threshold decided in the decision processing (S16) from the static object information stored in the storage unit 12. The reliability threshold decided in the decision processing (S16) is the first value R1, and thus the selection unit 15 selects the static object information based on the first value R1. As an instance, the selection unit deletes the static object information with reliability less than the first value R1 from the static object information stored in the storage unit 12 such that the static object information with reliability equal to or greater than the first value R1 remains.

In the instance illustrated in FIG. 5, the first static object CA1, the fourth static object CA4, the second static object CA2, and the sixth static object CA6 have reliability equal to or greater than the first value R1. In addition, the third static object CA3, the fifth static object CA5, and the seventh static object CA7 have reliability less than the first value R1. Accordingly, the selection unit 15 selects the first static object CAL the fourth static object CA4, the second static object CA2, and the sixth static object CA6 by deleting the third static object CA3, the fifth static object CA5, and the seventh static object CA7 from the first static object CA1 to the sixth static object CA6.

Figure 6:
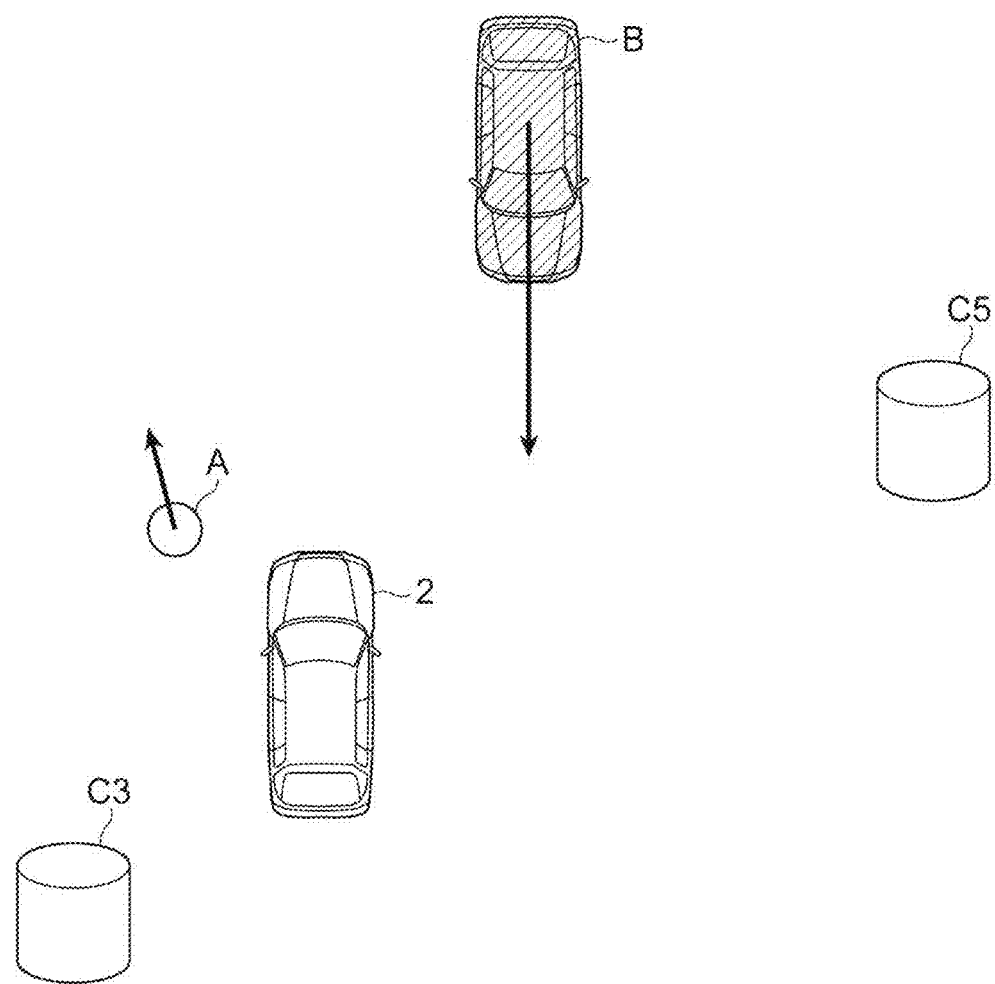
FIG. 6 is a diagram showing an instance of a tracking target decided based on FIGS. 4 and 5.

Next, the target decision unit 16 of the vehicle control device 1 decides a tracking target as tracking target decision processing (S20) by comparing the result of the object detection processing (S10) and the static object information selected by the selection processing (S18) to each other. The target decision unit 16 compares the pedestrian A, the other vehicle B, and the first static object CA1 to the sixth static object CA6 illustrated in FIG. 4 to the first static object CAL the fourth static object CA4, the second static object CA2, and the sixth static object CA6 illustrated in FIG. 5 and performs exclusion from the tracking target when both have the same characteristics. In other words, the target decision unit 16 decides detection results with different characteristics as tracking targets. FIG. 6 is a diagram showing an instance of the tracking target decided based on FIG. 4 and FIG. 5. As illustrated in FIG. 6, the target decision unit 16 excludes the first static object CAL the fourth static object CA4, the second static object CA2, and the sixth static object CA6 and decides the pedestrian A, the other vehicle B, the third static object CA3, and the fifth static object CA5 as tracking targets.

When the calculation load is a value less than the calculation load L2 (such as the calculation load L1), the reliability threshold is the second value R2 greater than the first value R1. In the instance in FIG. 5, the reliability of the first static object CA1 and the fourth static object CA4 is equal to or greater than the second value R2. In addition, the reliability of the second static object CA2, the third static object CA3, the fifth static object CA5, the sixth static object CA6, and the seventh static object CA7 is less than the second value R2. Accordingly, the selection unit 15 selects the first static object CA1 and the fourth static object CA4 by deleting the second static object CA2, the third static object CA3, the fifth static object CA5, the sixth static object CA6, and the seventh static object CA7 from the first static object CA1 to the sixth static object CA6. The target decision unit 16 excludes the first static object CAL the fourth static object CA4, the second static object CA2, and the sixth static object CA6 and decides the pedestrian A, the other vehicle B, the third static object CA3, and the fifth static object CA5 as tracking targets. The target decision unit 16 excludes the first static object CA1 and the fourth static object CA4 and decides the pedestrian A, the other vehicle B, the second static object CA2, the third static object CA3, the fifth static object CA5, and the sixth static object CA6 as tracking targets.

The number of tracking targets is smaller on the larger calculation load side when the tracking targets decided at the time of the calculation load L1 and the tracking targets decided at the time of the calculation load L2 are compared to each other. In this manner, the vehicle control device 1 decides tracking targets in accordance with the calculation load and the reliability.

Next, the tracking unit 17 of the vehicle control device 1 tracks the tracking target decided in the decision processing (S20) as tracking processing (S22). Next, the traveling control unit 18 of the vehicle control device 1 controls the traveling of the vehicle 2 as traveling control processing (S24).

Once the traveling control processing (S24) terminates, the vehicle control device 1 determines whether or not a termination operation for traveling control termination instruction is accepted by the driver or whether or not traveling control termination instruction is received from another system. When the termination operation or the termination instruction is not confirmed, the vehicle control device 1 initiates the flowchart in FIG. 3 from the beginning.

Summary of First Example

In the vehicle control device 1 according to this example, the selection unit 15 selects the static object information associated with reliability equal to or greater than the reliability threshold. Then, the reliability threshold is decided to be small with respect to an increase in the calculation load by the decision unit 14. In other words, the vehicle control device 1 is capable of increasing the number of selected static object information by lowering the reference of the reliability of the static object information selected as an object of comparison when the calculation load is large. As a result, the vehicle control device is capable of reducing the targets of the object tracking with respect to an increase in the calculation load in a state where reliability equal to or greater than the reliability threshold is secured. In addition, the vehicle control device 1 is capable of decreasing the number of selected static object information by raising the reference of the reliability of the static object information selected as an object of comparison when the calculation load is small. As a result, the vehicle control device 1 is capable of increasing the targets of the object tracking with respect to a decrease in the calculation load in a state where reliability equal to or greater than the reliability threshold is secured. In this manner, the vehicle control device 1 is capable of selecting the target of the object tracking in view of balance between the calculation load and the reliability of the static object information.

In addition, with the vehicle control device 1, highly reliable vehicle control can be performed even when calculation resources are limited. For instance, low-reliability static object information becomes less likely to be used, and thus a situation in which an object supposed to be tracked is not tracked based on low-reliability static object information can be prevented.

Second Example

The configuration of a vehicle control device according to a second example is identical to the configuration of the vehicle control device 1 according to the first example except that the decision unit 14 has an additional function. Duplicate description will not be repeated below.

The decision unit 14 decides the reliability threshold for each static object information. The decision unit 14 decides the reliability threshold to be small with respect to an increase in the distance between the vehicle 2 and a static object. As an instance, the decision unit 14 corrects the reliability threshold calculated in the first example for each static object information. Specifically, the decision unit 14 corrects the reliability threshold for each static object information by multiplying the reliability threshold by a correction coefficient (coefficient k) that depends on the distance between the vehicle 2 and a static object.

Figure 7:
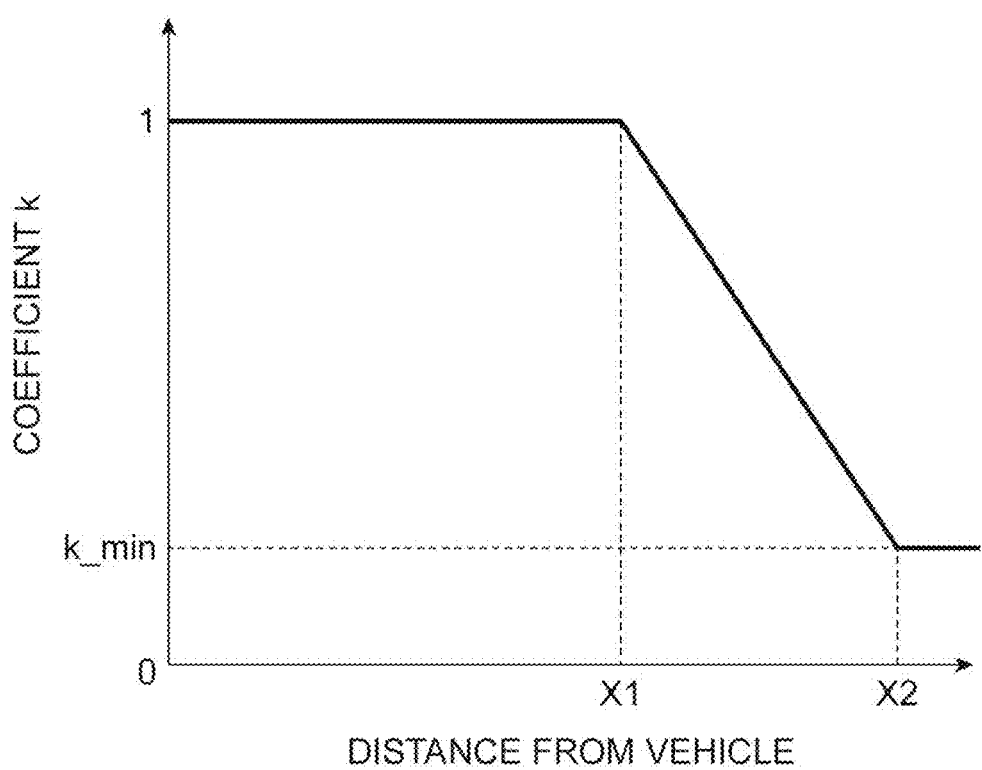
FIG. 7 is an instance of a graph illustrating the relationship between a coefficient and the distance from the vehicle.

FIG. 7 is an instance of a graph illustrating the relationship between the coefficient k and the distance from the vehicle 2. Illustrated in FIG. 7 is an instance of the relationship between the coefficient k by which the reliability threshold is multiplied and the distance from the vehicle 2 to the position of static object information. The vertical axis represents the coefficient k and the horizontal axis represents the distance of the static object information from the vehicle 2. As illustrated in FIG. 7, the coefficient k is 1 when the distance of the static object information from the vehicle 2 is within a first distance X1 and k is equal to or greater than k_min and is less than 1 when the distance of the static object information from the vehicle 2 exceeds the first distance X1. k is equal to k_min when the distance of the static object information from the vehicle 2 exceeds a second distance X2. The distance from the vehicle 2 to the position of the static object information is obtained from the positional information of the static object information held in the storage unit 12 and the positional information of the vehicle 2 acquired by the GPS receiving unit 4. In addition, the value of k_min may be any value less than 1. In addition, from the first distance X1 to the second distance X2, the coefficient k may monotonically decrease in accordance with an increase in distance, the coefficient k may exponentially decrease in accordance with an increase in distance, and the coefficient k may decrease in stages in accordance with an increase in distance. In other words, the coefficient k may decrease as an overall tendency as the distance increases.

Figure 8:
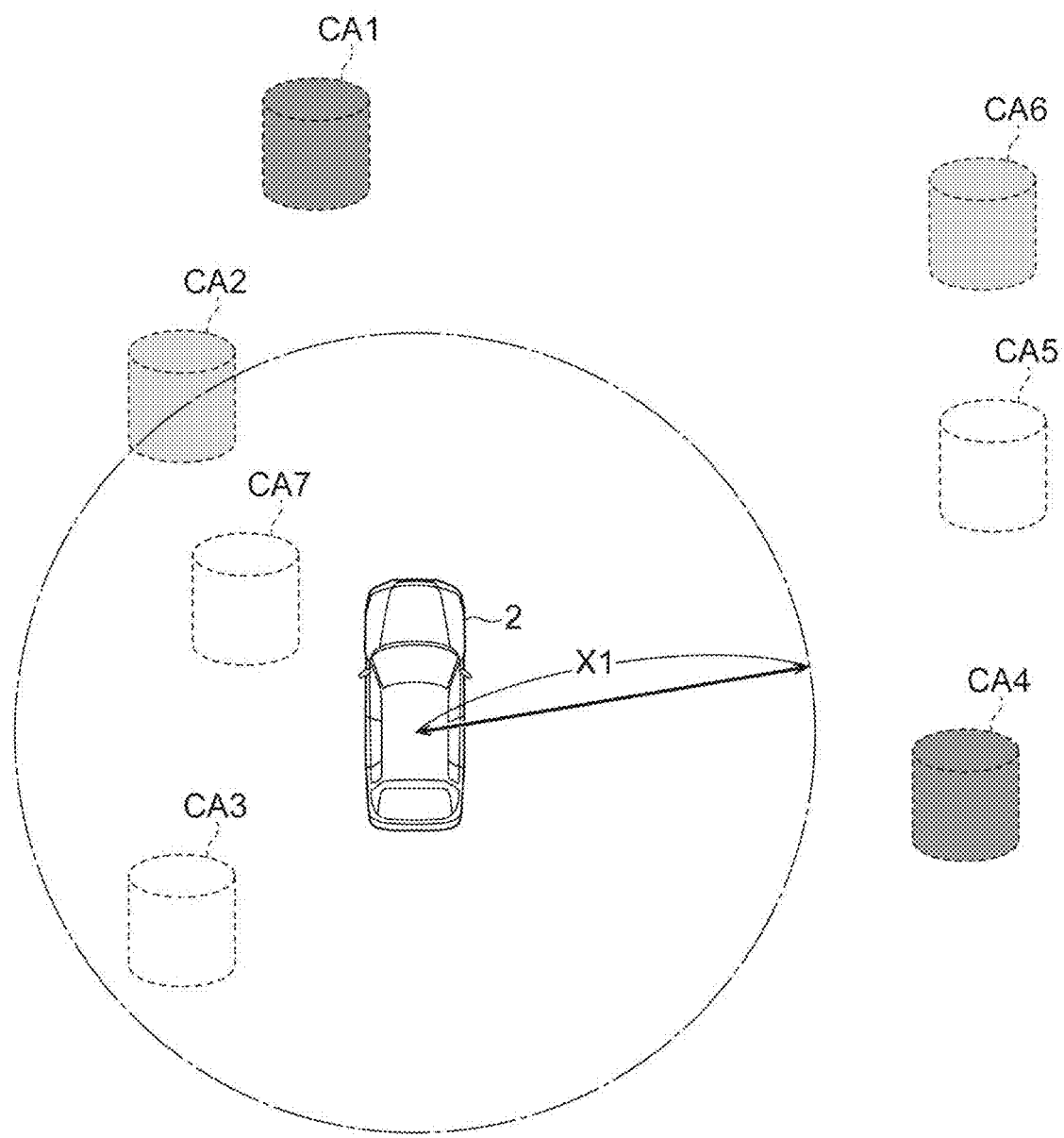
FIG. 8 is a diagram showing an instance of the static object information.

FIG. 8 is a diagram showing an instance of the static object information. As in FIG. 5, illustrated in FIG. 8 are the reliability and the position regarding the information on the static objects around the vehicle 2 held in the storage unit 12. In FIG. 8, the range of the first distance X1 from the vehicle 2 is indicated by the one-dot chain line circle centered on the vehicle 2. As illustrated in FIG. 8, the first static object CA1, the second static object CA2, the fourth static object CA4, the fifth static object CA5, and the sixth static object CA6 are separated from the vehicle 2 by more than the first distance X1. The third static object CA3 and the seventh static object CA7 are positioned within the first distance X1 from the vehicle 2.

As described in the first example, the reliability threshold is the first value R1 when the calculation load of the ECU 10 is the calculation load L2. The decision unit 14 corrects the first value R1 for each static object. Firstly, the decision unit 14 decides the coefficient k for each static object. The decision unit 14 decides the coefficient k of the first static object CA1, the second static object CA2, the fourth static object CA4, the fifth static object CA5, and the sixth static object CA6 from the range of k_min≤k<1 with reference to FIG. 7. Next, the decision unit 14 decides the coefficient k of the third static object CA3 and the seventh static object CA7 to "1". The decision unit 14 performs the correction by multiplying the first value R1 by the decided coefficient k. The selection unit 15 in the latter stage selects the static object information by using the corrected reliability threshold.

In the instance in FIG. 8, the reliability threshold does not change through the correction with regard to the third static object CA3 and the seventh static object CA7 because the third static object CA3 and the seventh static object CA7 have a coefficient k of "1". In other words, the result is the same as in the content described in the first example. The selection unit 15 compares the reliability of the third static object CA3 and the seventh static object CA7 (reliability less than the first value R1) to the corrected reliability threshold (first value R1×1) and does not select the third static object CA3 and the seventh static object CA7 as a static object to be compared.

The coefficient k is equal to or greater than k_min and is less than 1 with regard to the first static object CA1, the second static object CA2, the fourth static object CA4, the fifth static object CA5, and the sixth static object CA6. Accordingly, the reliability threshold is set lower than the first value R1 through the correction.

The reliability of the first static object CA1, the second static object CA2, the fourth static object CA4, and the sixth static object CA6 is equal to or greater than the first value R1. Accordingly, the result is the same as in the content described in the first example. The selection unit 15 selects the first static object CA1, the second static object CA2, the fourth static object CA4, and the sixth static object CA6 as static objects to be compared.

Figure 9:
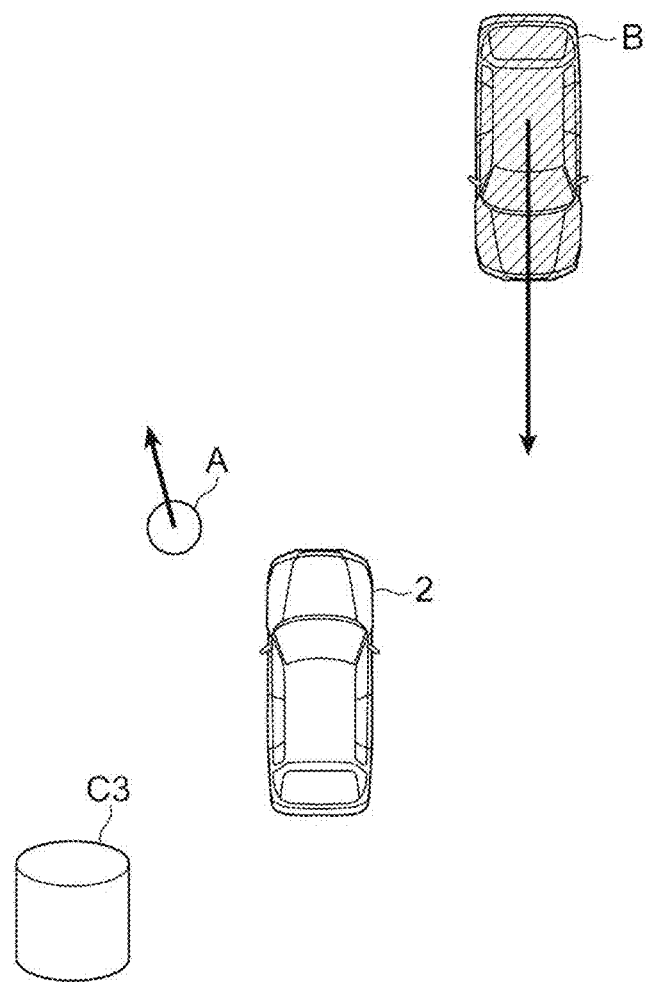
FIG. 9 is a diagram showing an instance of a tracking target decided based on FIGS. 4 and 7.

The reliability of the fifth static object CA5 is less than the first value R1. The selection unit 15 compares the reliability of the fifth static object CA5 (reliability less than the first value R1) to the corrected reliability threshold (first value R1×k). Here, the reliability of the fifth static object CA5 is assumed to be greater than the corrected reliability threshold. In this case, the selection unit 15 selects the fifth static object CA5 as a static object to be compared. FIG. 9 is a diagram showing an instance of tracking targets decided based on FIG. 4 and FIG. 7. Comparison between FIG. 9 and the tracking targets according to the first example (FIG. 6) shows that the fifth static object CA5 is not a tracking target in FIG. 9 whereas the fifth static object CA5 is a tracking target in FIG. 6.

Summary of Second Example

The vehicle control device according to the second example is capable of preferentially selecting a distant static object unlikely to come into contact with the vehicle 2 as static object information to be compared. In addition, the vehicle control device is capable of suppressing an overall calculation load while ensuring calculation resources with respect to tracking of an object relatively close in distance from the vehicle 2 by setting a threshold easily used by the static object information far in distance from the vehicle 2.

Third Example

Figure 10:
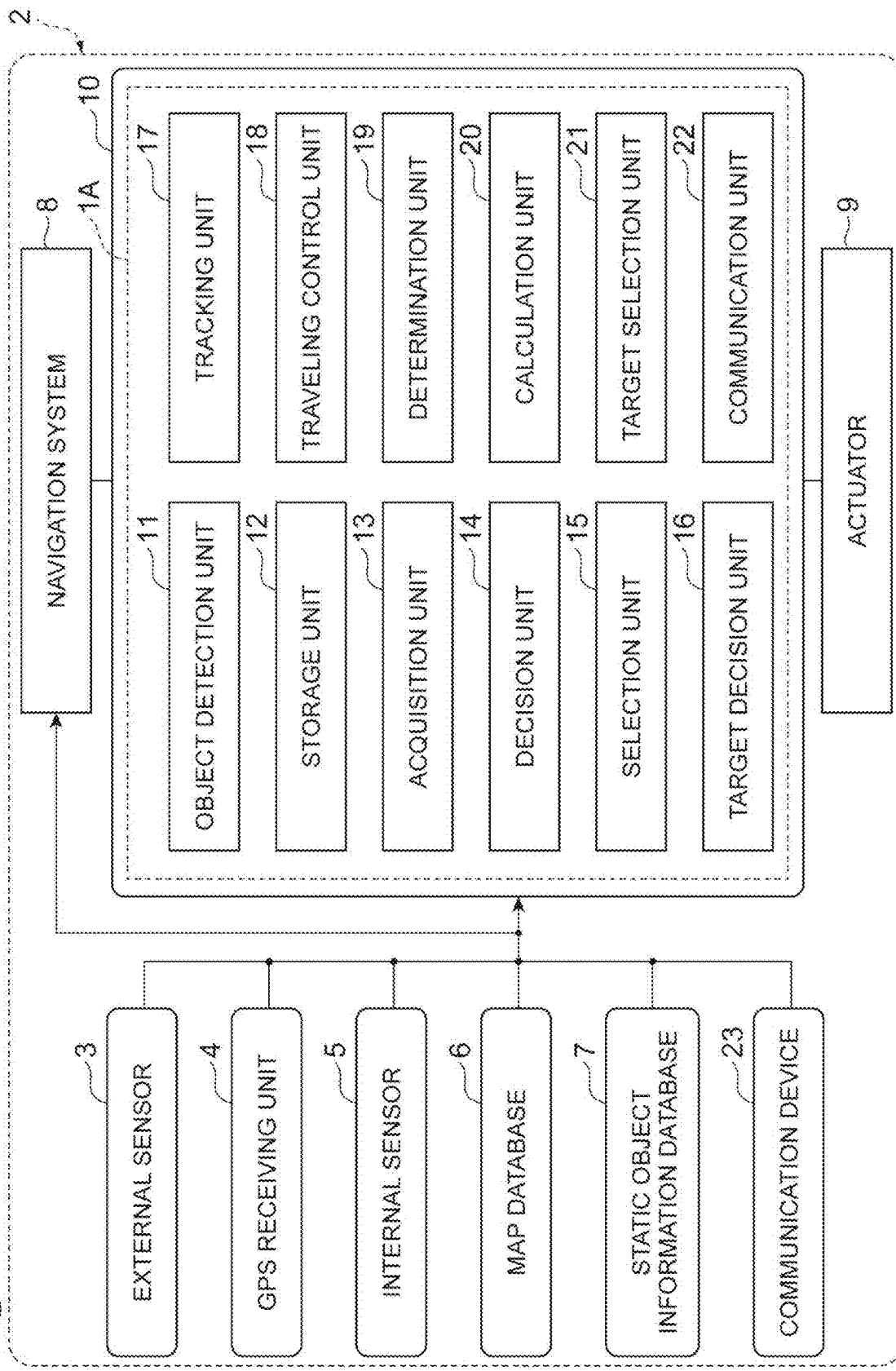
FIG. 10 is a block diagram illustrating an instance of the configuration of a vehicle provided with a vehicle control device according to a third example.

The configuration of a vehicle control device 1A according to a third example is identical to the configuration of the vehicle control device 1 according to the first example except that the vehicle control device 1A is provided with a determination unit 19, a calculation unit 20, a target selection unit 21, a communication unit 22, and a communication device 23. Duplicate description will not be repeated below.
Configuration of Vehicle Control Device FIG. 10 is a block diagram illustrating an instance of the configuration of the vehicle 2 provided with the vehicle control device 1A according to the third example. As illustrated in FIG. 10, the vehicle 2 is provided with the communication device 23. The communication device 23 is communication equipment capable of communicating with a server outside the vehicle 2. The communication device 23 is connected to the ECU 10.

The ECU 10 is provided with the determination unit 19, the calculation unit 20, the target selection unit 21, and the communication unit 22 in addition to the function described in the first example.

The determination unit 19 determines whether or not an object detected by the object detection unit 11 is a static object based on the static object information stored in the storage unit 12. The determination unit 19 compares the static object information and the result of the object detection and determines that the object is a static object when the information and the result correspond to each other.

The calculation unit 20 calculates the reliability of the detection result of the object determined as a static object by the determination unit 19. The method for the reliability calculation is the same as the content described in the first example.

The target selection unit 21 selects transmission targets. The target selection unit 21 selects object detection results in a predetermined priority order such that the total capacity of selected object detection results is equal to or less than a predetermined communication amount. The target selection unit 21 gives a higher priority order to an object detection result with lower reliability calculated by the calculation unit 20. As an instance, the target selection unit 21 is assumed to detect 10 static objects. No transmission target sorting is needed when the total capacity of the detection results of the 10 static objects exceeds a predetermined communication amount. The target selection unit 21 selects, as the transmission targets, the object detection results in descending order of reliability among the 10 static objects.

The communication unit 22 transmits the object detection results selected by the target selection unit 21 to the server capable of communicating with the vehicle 2. As an instance, the communication unit 22 generates transmission information and transmits the transmission information to the server via the communication device 23. The server updates the static object information held in the server based on a detection result aggregated from a plurality of vehicles. The server delivers the static object information to the vehicle if necessary.

Figure 11:
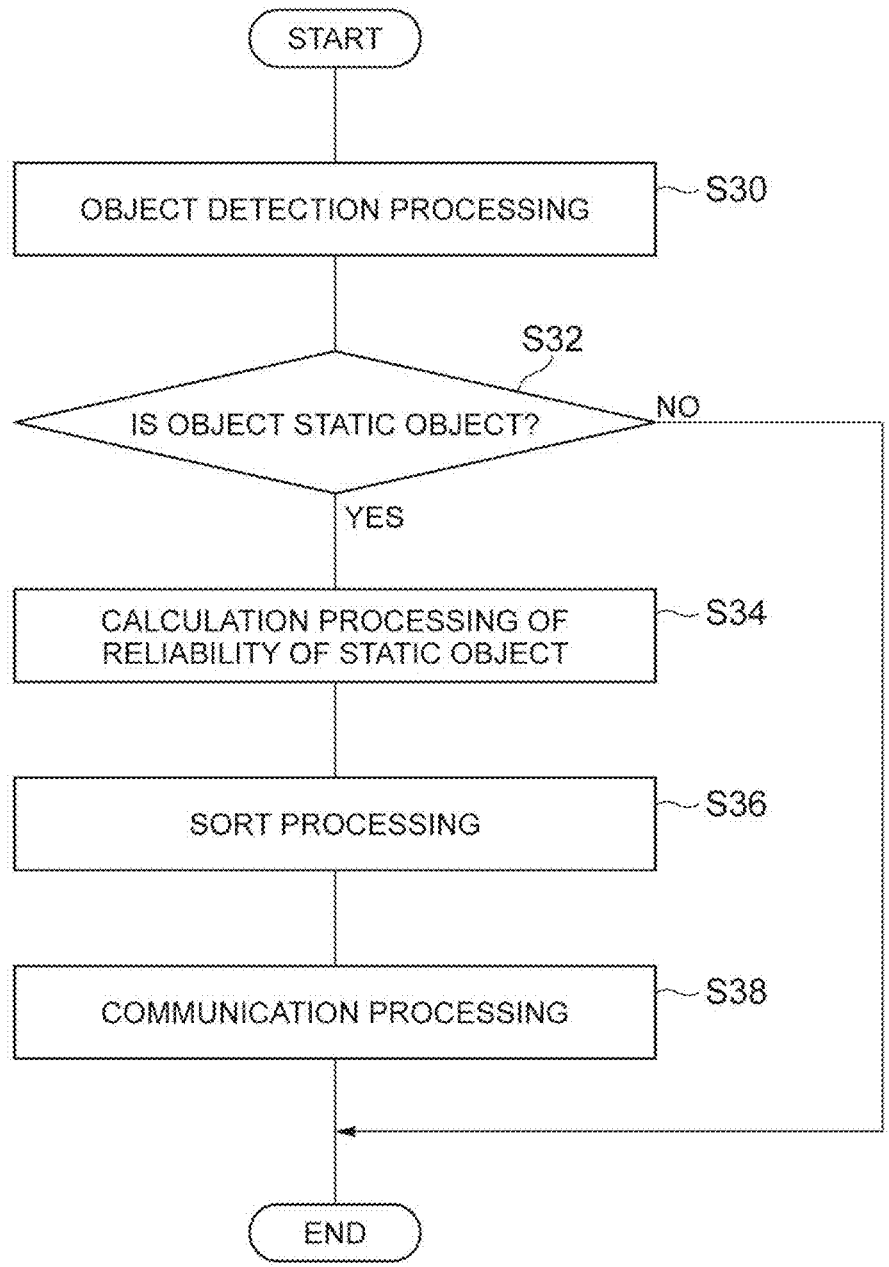
FIG. 11 is a flowchart illustrating an instance of data transmission processing.

The vehicle control device 1A is identical to the vehicle control device 1 when it comes to the rest of the configuration thereof.
Operation of Vehicle Control Device FIG. 11 is a flowchart illustrating an instance of data transmission processing. The flowchart illustrated in FIG. 11 is executed at a timing when, for instance, an upload-allowing operation is accepted by a driver.

As illustrated in FIG. 11, the object detection unit 11 of the vehicle control device 1A detects objects around the vehicle 2 based on the detection result of the external sensor 3 as object detection processing (S30).

Next, the determination unit 19 of the vehicle control device 1A determines whether or not an object detected in the object detection processing (S30) is a static object based on the static object information stored in the storage unit 12 as determination processing (S32).

When the object is a static object (S32: YES), the calculation unit 20 of the vehicle control device 1A calculates, as calculation processing (S34), the reliability of the detection result of the object determined as a static object in the determination processing (S32).

Next, the target selection unit 21 of the vehicle control device 1A sorts, as sort processing (S36), the object detection results starting from the lowest reliability calculated in the calculation processing (S34). Then, the target selection unit 21 selects the object detection results in descending order of reliability such that the total capacity of the transmission targets is equal to or less than a predetermined communication amount.

Next, the communication unit 22 of the vehicle control device 1A transmits, as communication processing (S38), the object detection results selected by the target selection unit 21 to the server capable of communicating with the vehicle 2.

When the object is not a static object (S32: NO) or when the communication processing (S38) terminates, the vehicle control device 1A determines whether or not a termination operation for upload permission termination instruction is accepted by the driver or whether or not an upload termination instruction is received from another system. When the termination operation or the termination instruction is not confirmed, the vehicle control device 1A initiates the flowchart in FIG. 11 from the beginning.

Summary of Third Example

The vehicle control device 1A according to the third example is capable of preferentially transmitting a low-reliability object detection result to the server in a limited communication capacity. As a result, the vehicle control device 1A is capable of updating fast-changing static object information in the data held on the server side as soon as possible.

The above-described examples can be implemented in various forms changed and improved based on the knowledge of those skilled in the art.

For instance, the selection unit 15 may exclude an object that had time series variation from the static object information to be compared as an object requiring re-detection, even when the reliability of the corresponding static object information is equal to or greater than the reliability threshold, based on the time series variation of the object detected by the object detection unit 11. In addition, the reliability threshold may be corrected, based on the time series variation of the object detected by the object detection unit 11, to be likely to be excluded from the static object information of the object of comparison.

The target decision unit 16 may also add an object not decided as the tracking target as a tracking target based on the time series variation of the object detected by the object detection unit 11.

The ECU 10 may be provided with an update unit updating the static object information database 7. The update unit may perform updating by receiving information from the server outside the vehicle 2 or may reflect the reliability calculated by the calculation unit 20 in the static object information database 7.

The object detection processing (S10), the reading processing (S12), and the calculation load acquisition processing (S14) do not have to be executed in the order illustrated in FIG. 3 and can be executed in random order.

The decision unit 14 may be further corrected based on the degree of risk of the reliability threshold. The degree of risk can be set based on evaluation of a past history, the position, the size, and the type of a static object, and the relative distance thereof from the vehicle 2. For instance, the evaluation value of each item may be linearly weighted. The decision unit 14 is capable of assuming a highly risky object as a tracking target insofar as the object does not have corresponding reliability by correcting the reliability threshold large with respect to an increase in the degree of risk.

What is claimed is:

1. A vehicle control device comprising:
   at least one processor and memory, wherein
   the memory is configured to store static object information acquired in advance and reliability of the static object information in association with each other, and
   the memory comprises computer instructions that are configured to, when executed by the at least one processor, cause the at least one processor to:
   detect, based on an output of at least one sensor, an object around a vehicle as a detection result;
   acquire calculation load information of the vehicle control device;
   decide a reliability threshold to be small with respect to an increase in a calculation load based on the calculation load information;
   select the static object information associated with reliability equal to or greater than the reliability threshold decided from the static object information stored in the memory;
   decide a tracking target around the vehicle by comparing the detection result and the static object information selected to each other; and
   track the tracking target decided as a tracking result; and
   perform traveling control based on the tracking result.

2. The vehicle control device according to claim 1, wherein the computer instructions are configured to, when executed by the at least one processor, cause the at least one processor to:
   determine whether or not the object detected is a static object based on the static object information stored in the memory;
   calculate reliability of a detection result of the object determined as the static object; and
   select the detection result of the object in a predetermined priority order such that a total capacity of selected detection results of objects is equal to or less than a predetermined communication amount; and
   transmit the detection result, of the object, selected to a server capable of communicating with the vehicle,
   wherein the computer instructions are configured to cause the at least one processor to give a higher priority order to a detection result of the object with the lower reliability calculated.

3. The vehicle control device according to claim 2, wherein the computer instructions are configured to, when executed by the at least one processor, cause the at least one processor to decide the reliability threshold for each of the static object information and decide the reliability threshold to be small with respect to an increase in a distance between the vehicle and the static object.

4. The vehicle control device according to claim 1, wherein the computer instructions are configured to, when executed by the at least one processor, cause the at least one processor to decide the reliability threshold for each of the static object information and decide the reliability threshold to be small with respect to an increase in a distance between the vehicle and a static object.

5. The vehicle control device according to claim 1, wherein the static object information includes information about a static object around the vehicle.

6. The vehicle control device according to claim 1, wherein the calculation load information includes a utilization or occupancy rate of hardware or software resources.

* * * * *